US012639599B2

(12) United States Patent
Bhattacharjya et al.

(10) Patent No.: US 12,639,599 B2
(45) Date of Patent: May 26, 2026

(54) MODELING BI-DIRECTIONAL EFFECTS BETWEEN EVENTS AND SYSTEM VARIABLES

(71) Applicant: International Business Machines Corporation, Armonk, NY (US)

(72) Inventors: Debarun Bhattacharjya, New York, NY (US); Tian Gao, Berkeley Heights, NJ (US); Dharmashankar Subramanian, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1092 days.

(21) Appl. No.: 17/646,429

(22) Filed: Dec. 29, 2021

(65) Prior Publication Data

US 2023/0206116 A1      Jun. 29, 2023

(51) Int. Cl.
| | |
|---|---|
| *G06N 7/01* | (2023.01) |
| *G06F 11/07* | (2006.01) |
| *G06F 16/901* | (2019.01) |
| *G06N 5/022* | (2023.01) |
| *G06N 20/00* | (2019.01) |
| *H04L 41/0631* | (2022.01) |

(52) U.S. Cl.
CPC ........... *G06N 7/01* (2023.01); *G06F 16/9024* (2019.01); *G06N 5/022* (2013.01); *G06N 20/00* (2019.01); *G06F 11/079* (2013.01); *H04L 41/0631* (2013.01); *H04L 41/0636* (2013.01)

(58) Field of Classification Search
CPC .......... G06N 7/01; G06N 5/022; G06N 20/00; G06F 16/9024; G06F 11/079; H04L 41/0631; H04L 41/0636
See application file for complete search history.

(56) References Cited

U.S. PATENT DOCUMENTS

| | | | |
|---|---|---|---|
| 9,047,558 B2 * | 6/2015 | Hochstein | ............... G06N 7/01 |
| 2020/0160189 A1 | 5/2020 | Bhattacharjya et al. | |
| 2024/0020813 A1 * | 1/2024 | Weber | ................... G06V 40/20 |

OTHER PUBLICATIONS

Bhattacharjya, D. et al. l "State Variable Effects in Graphical Event Models". https://www.ijcai.org/proceedings/2020/592, Proceedings of the Twenty-Ninth International Joint Conference on Artificial Intelligence Main track. pp. 4291-4297. https://doi.org/10.24963/ijcai.2020/592, January 7, 202, 7 pages.

(Continued)

*Primary Examiner* — Andrew L Tank
(74) *Attorney, Agent, or Firm* — Amin, Turocy & Watson, LLP

(57) ABSTRACT

Systems, computer-implemented methods, and computer program products to facilitate modeling bi-directional effects between events and system variables are provided. According to an embodiment, a system can comprise a processor that executes components stored in memory. The computer executable components comprise a machine learning component that learns mutual dependencies jointly over event occurrence data and transition data, wherein the transition data comprises state variable transitions observed over a multivariate state variable set.

16 Claims, 10 Drawing Sheets

400

410

(b)

(56) References Cited

OTHER PUBLICATIONS

Glavas, G. et al. | "Construction and Evaluation of Event Graphs". Natural Language Engineering / vol. 21 / Issue 04 / Aug. 2015, pp. 607-652, DOI: 10.1017/S1351324914000060, Published online: May 1, 2014, 47 pages.

Wu, Y. et al. | "Towards Better Detection and Analysis of Massive Spatiotemporal Co-Occurrence patterns". IEEE Transactions on Intelligent Transportation Systems, Journal of Latex Class Files, vol. 14, No. 8, Aug. 2015, 15 pages.

Bhattacharjya, D. et al. | "Event-Driven Continuous Time Bayesian Networks". vol. 34 No. 04: AAAI-20 Technical Tracks 4 / AAAI Technical Track: Machine Learning, DOI: https://doi.org/10.1609/aaai.v34i04.5725, published Apr. 3, 2020, 10 pages.

Bhattacharjya, D. et al. | "Structure Discovery in (Causal) Proximal Graphical Event Models". Causal Discovery & Causality-Inspired Machine Learning Workshop at Neural Information Processing Systems, https://research.ibm.com/publications/structure-discovery-in-causal-proximal-graphical-event-models, Dec. 6, 2020, 11 pages.

Dean, Th. et al. | "A model for reasoning about persistence and causation". First published: Feb. 1989 https://doi.org/10.1111/j.1467-8640.1989.tb00324.x, Comput. Intell. vol. 5, Issue 2 pp. 142-150, 9 pages.

Dahlhaus, R. et al., "Causality and graphical models in time series analysis," 1999, https://galton.uchicago.edu/~eichler/hsss.pdf, 21 pages.

Nodelman, U. et al. | "Continuous Time Bayesian networks". UAI 2002, 10 pages.

Meek, Ch. et al. | "Toward Learning Graphical and Causal Process Models". CI@UAI (2014), 6 pages.

Murphy, K. P. et al. | "Dynamic Bayesian Networks: Representation, Inference and Learning" Nov. 12, 2002, www.ai.mit.edu/murphyk, 55 pages.

Gunawardana, A. et al. | "Universal Models of Multivariate Temporal Point Processes (With Supplementary Appendix Containing Proofs)". Proceedings of the 19th International Conference on Articial Intelligence and Statistics (AISTATS) 2016, Cadiz, Spain. JMLR: W&CP vol. 41, 12 pages.

Didelez, V. | "Graphical Models for Marked Point Processes based on Local Independence". Research Report No. 258, Department of Statistical Science, University College London, Date: Oct. 2005, 33 pages.

Murphy, K. P. | "Dynamic Bayesian Networks: Representation, Inference and Learning". A dissertation submitted in partial satisfaction of the requirements for the degree of Doctor of Philosophy, Fall 2002, 225 pages.

Bhattacharjya, D. et al. | "Proximal Graphical Event Models". 32nd Conference on Neural Information Processing Systems (NeurIPS 2018), Montreal, Canada, 10 pages.

* cited by examiner

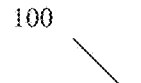
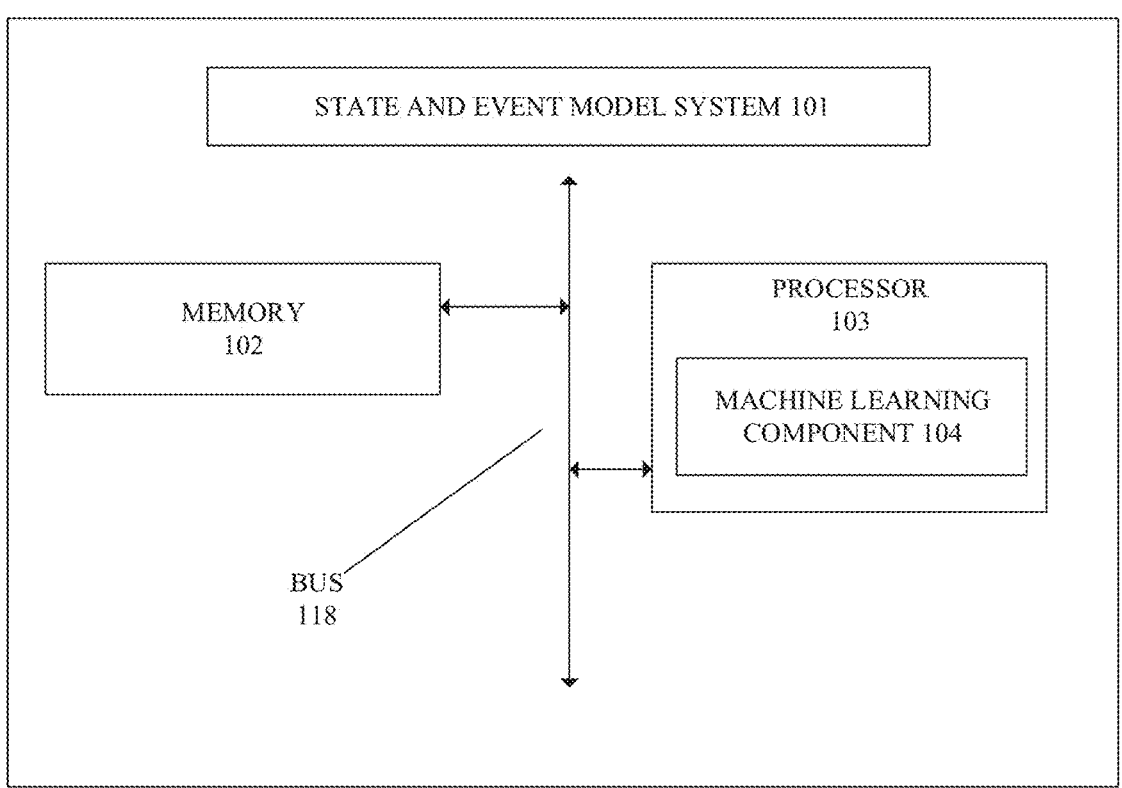
FIG. 1

200

STATE AND EVENT MODEL SYSTEM 101

MEMORY
102

PROCESSOR
103

MACHINE LEARNING
COMPONENT 104

PREDICTION
COMPONENT 205

INTERVENTION
COMPONENT 206

BUS
118

| Dataset | $|X|$ | $|E|$ | $\sum_i N_i$ | $N_e$ |
|---|---|---|---|---|
| Synthetic | 5 | 5 | $\sim[35\text{-}45.9]K$ | $\sim[15.1\text{-}16.9]K$ |
| Eastman | 16 | 18 | $\sim[84\text{-}102.3]K$ | $\sim[22.6\text{-}25.4]K$ |
| Diabetes | 1 | 11 | $\sim6.2K$ | $\sim14K$ |
| Crypto | 2 | 6 | 0 | $\sim46.4K$ |

| Dataset | SVGEM-MP-MP | SVGEM-MP-PP | CTBN+PCEM | CTBN+PCIM | PCIEM-each |
|---|---|---|---|---|---|
| Synth#1 | -15846 | -16441 (each/in/out) | -16507 | -16499 | -17985 |
| Synth#2 | -19888 | -20201 (each) | -20961 | -20957 | -23602 |
| Synth#3 | -15959 | -16377 (each/in/out) | -16439 | -16447 | -17991 |
| Eastman#1 | -1420 | -1236 (in) | -1432 | -1580 | -3183 |
| Eastman#2 | -836 | -684 (out) | -1034 | -1352 | -1255 |
| Diabetes | -3223 | -2456 (in) | -3740 | -3556 | -3708 |
| Crypto | -45298 | N/A | -4562 | -4221 | N/A |

Learning, by a system, mutual dependencies jointly over event occurrence data and transition data, wherein the transition data comprises state variable transitions observed over a multivariate state variable set.

820

Generating, by the system, predictive alerts comprising an expected event type and an expected state transition.

900

910

920

930

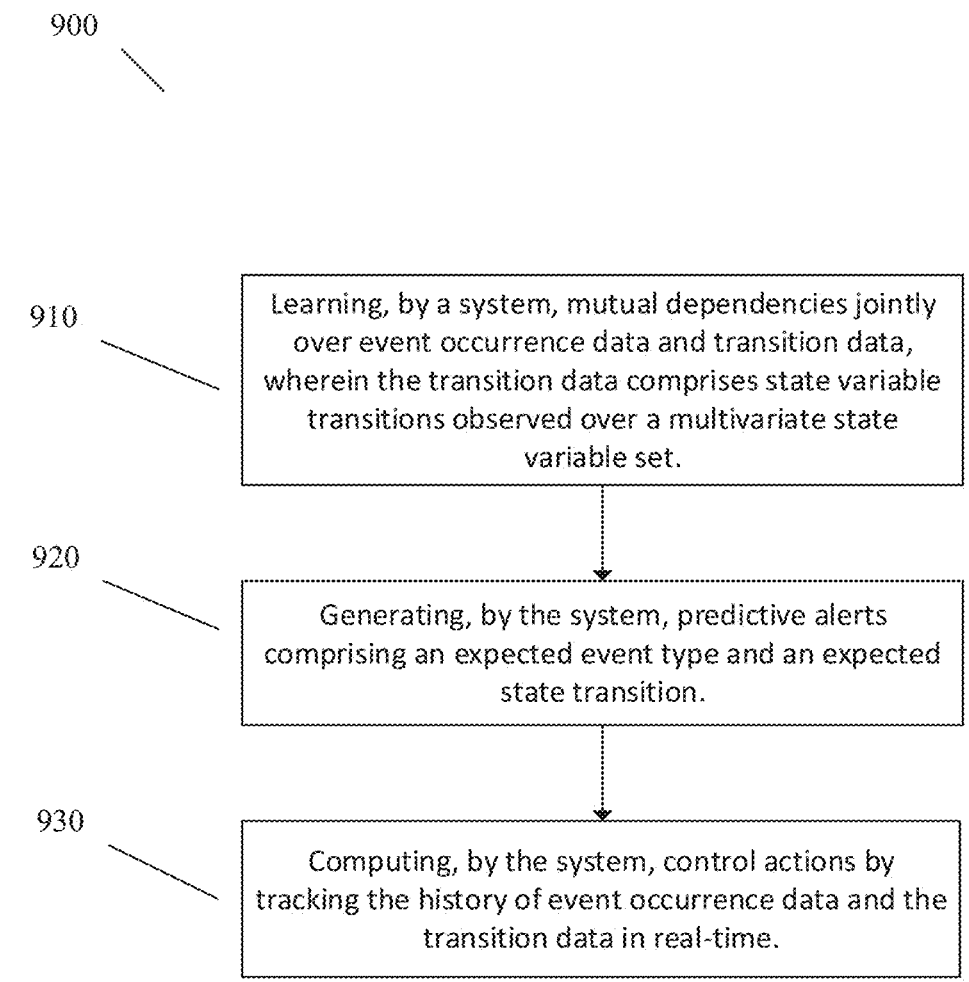

Learning, by a system, mutual dependencies jointly over event occurrence data and transition data, wherein the transition data comprises state variable transitions observed over a multivariate state variable set.

Generating, by the system, predictive alerts comprising an expected event type and an expected state transition.

Computing, by the system, control actions by tracking the history of event occurrence data and the transition data in real-time.

FIG. 9

MODELING BI-DIRECTIONAL EFFECTS BETWEEN EVENTS AND SYSTEM VARIABLES

BACKGROUND

The subject disclosure relates to machine learning, and more specifically to modeling bi-directional effects between events and system variables.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate modeling bi-directional effects between events and system variables in accordance with one or more embodiments described herein.

According to an embodiment, a system can comprise a processor that executes computer executable components stored in memory. The computer executable components comprise a machine learning component that learns mutual dependencies jointly over event occurrence data and transition data, wherein the transition data comprises state variable transitions observed over a multivariate state variable set.

According to another embodiment, a computer-implemented method can comprise learning, by a system, operatively coupled to a processor, mutual dependencies jointly over event occurrence data and transition data, wherein the transition data comprises state variable transitions observed over a multivariate state variable set.

According to another embodiment, a computer program product comprising a computer readable storage medium having program instructions embodied therewith, the program instructions executable by a processor to cause the processor to learn mutual dependencies jointly over event occurrence data and transition data, wherein the transition data comprises state variable transitions observed over a multivariate state variable set.

DESCRIPTION OF THE DRAWINGS

FIG. 1 illustrates a block diagram of an example, non-limiting system that can facilitate modeling bi-directional effects between events and system variables in accordance with one or more embodiments described herein.

FIG. 6 illustrates a diagram representation of dataset information in accordance with one or more embodiments described herein.

FIG. 7 illustrates a diagram representation of log likelihood for various test data sets and models in accordance with one or more embodiments described herein.

FIG. 9 illustrates a flow diagram of an example, non-limiting computer-implemented method that can facilitate modeling bi-directional effects between events and system variables in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Many real-world domains involve co-evolving relationships between events and time-varying random variables. In particular, the change in value of, or state transition of, time-varying random variables is often driven by events and the change in value of other time-varying random variables, and as such efficiently learning and representing these relationship enables more accurate and efficient modeling of joint temporal datasets. However, existing models tend to treat changes in the value of time-varying random variables as events themselves, leading to models that are cluttered and use a large number of event variables and associates between event variables.

Given problems described above with exiting models, the present disclosure can be implemented to produce a solution to the problems described above in the form of systems, computer-implemented methods, and/or computer program products that can facilitate modeling bi-directional effects between events and system variables by: learning mutual dependencies jointly over event occurrence data and transition data, wherein the transition data comprises state variable transitions observed over a multivariate state variable set. For example, by representing state variable transitions as a separate class of variables from event variables, a model can be generated that effectively models mutual dependencies while using fewer overall variables and fewer associations between variables.

In some embodiments, the present disclosure can be implemented to produce a solution to the problems described above in the form of systems, computer-implemented methods, and/or computer program products that can further facilitate modeling bi-directional effects between events and system variables by: generating predictive alerts, wherein the predictive alerts comprise an expected event type and an expected transition.

Figure 2:
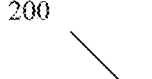
FIG. 2 illustrates a block diagram of an example, non-limiting system that can facilitate modeling bi-directional effects between events and system variables in accordance with one or more embodiments described herein.

FIGS. 1 and 2 illustrate block diagrams of example, non-limiting systems 100 and 200, respectively, that can each facilitate modeling bi-directional effects between events and system variables in accordance with one or more embodiments described herein. System 100 and 200 can each comprise a state and event model system 101. State and event model system 101 depicted in FIG. 1 can comprise a memory 102, a processor 103, a machine learning component 104, and/or a bus 118. State and event model system 101 of system 200 depicted in FIG. 2 can further comprise a prediction component 205, and/or an intervention component 206.

It should be appreciated that the embodiments of the subject disclosure depicted in various figures disclosed herein are for illustration only, and as such, the architecture of such embodiments are not limited to the systems, device, and/or components depicted therein. For example, in some embodiments, system 100, system 200, and/or state and event model system 101 can further comprise various computer and/or computing-based elements described herein with reference to operating environment 1000 and FIG. 10. In several embodiments, such computer and/or computing-based elements can be used in connection with implementing one or more systems, devices, components, and/or computer-implemented operations shown and described in connection with FIG. 1, FIG. 2, and/or other figures disclosed herein.

Memory 102 can store one or more computer and/or machine readable, writable, and/or executable components and/or instructions that, when executed by processor 103 (e.g., a classical processor, a quantum processor, and/or another type of processor), can facilitate performance of operations defined by the executable component(s) and/or instruction(s). For example, memory 102 can store computer and/or machine readable, writable, and/or executable components and/or instructions that, when executed by processor 103, can facilitate execution of the various functions described herein relating to state and event model system 101, machine learning component 104, prediction component 205, intervention component 206, and/or another component associated with state and event model system 101 as described herein with or without reference to the various figures of the subject disclosure.

Memory 102 can comprise volatile memory (e.g., random access memory (RAM), static RAM (SRAM), dynamic RAM (DRAM), and/or another type of volatile memory) and/or non-volatile memory (e.g., read only memory (ROM), programmable ROM (PROM), electrically programmable ROM (EPROM), electrically erasable programmable ROM (EEPROM), and/or another type of non-volatile memory) that can employ one or more memory architectures. Further examples of memory 102 are described below with reference to system memory 1016 and FIG. 10. Such examples of memory 102 can be employed to implement any embodiments of the subject disclosure.

Processor 103 can comprise one or more types of processors and/or electronic circuitry (e.g., a classical processor, a quantum processor, and/or another type of processor and/or electronic circuitry) that can implement one or more computer and/or machine readable, writable, and/or executable components and/or instructions that can be stored on memory 102. For example, processor 103 can perform various operations that can be specified by such computer and/or machine readable, writable, and/or executable components and/or instructions including, but not limited to, logic, control, input/output (I/O), arithmetic, and/or the like. In some embodiments, processor 103 can comprise one or more central processing unit, multi-core processor, microprocessor, dual microprocessors, microcontroller, System on a Chip (SOC), array processor, vector processor, quantum processor, and/or another type of processor. Further examples of processor 103 are described below with reference to processing unit 1014 and FIG. 10. Such examples of processor 103 can be employed to implement any embodiments of the subject disclosure.

State and event model system 101, memory 102, processor 103, machine learning component 104, prediction component 205, intervention component 206, and/or another component of state and event model system 101 as described herein can be communicatively, electrically, operatively, and/or optically coupled to one another via bus 118 to perform functions of system 100, system 200, state and event model system 101, and/or any components coupled therewith. Bus 118 can comprise one or more memory bus, memory controller, peripheral bus, external bus, local bus, a quantum bus, and/or another type of bus that can employ various bus architectures. Further examples of bus 118 are described below with reference to system bus 1018 and FIG. 10. Such examples of bus 118 can be employed to implement any embodiments of the subject disclosure.

State and event model system 101 can comprise any type of component, machine, device, facility, apparatus, and/or instrument that comprises a processor and/or can be capable of effective and/or operative communication with a wired and/or wireless network. All embodiments are envisioned. For example, state and event model system 101 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

State and event model system 101 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a wire and/or a cable. For example, state and event model system 101 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a data cable including, but not limited to, a High-Definition Multimedia Interface (HDMI) cable, a recommended standard (RS) 232 cable, an Ethernet cable, and/or another data cable.

In some embodiments, state and event model system 101 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet) or a local area network (LAN). State and event model system 101 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, state and event model system 101 can comprise hardware (e.g., a central processing unit (CPU), a transceiver, a decoder, quantum hardware, a quantum processor, and/or other hardware), software (e.g., a set of threads, a set of processes, software in execution, quantum pulse schedule, quantum circuit, quantum gates, and/or other software) or a combination of hardware and software that can facilitate communicating information between state and event model system 101 and external systems, sources, and/or devices (e.g., computing devices, communication devices, and/or another type of external system, source, and/or device).

State and event model system 101 can comprise one or more computer and/or machine readable, writable, and/or executable components and/or instructions that, when executed by processor 103 (e.g., a classical processor, a quantum processor, and/or another type of processor), can facilitate performance of operations defined by such component(s) and/or instruction(s). Further, in numerous embodiments, any component associated with state and event model system 101, as described herein with or without reference to the various figures of the subject disclosure, can comprise one or more computer and/or machine readable, writable, and/or executable components and/or instructions that when executed by processor 103, can facilitate performance of operations defined by such component(s) and/or instruction(s). For example, machine learning component 104, prediction component 205, intervention component 206, and/or any other components associated with state and event model system 101 as disclosed herein (e.g., communicatively, electronically, operatively, and/or optically coupled with and/or employed by state and event model system 101), can comprise such computer and/or machine readable, writable, and/or executable component(s) and/or instruction(s). Consequently, according to numerous embodiments, state and event model system 101 and/or components associated therewith as disclosed herein, can employ processor 103 to execute such computer and/or machine readable, writable, and/or executable component(s) and/or instruction(s) to facilitate performance of one or more operations described herein with reference to state and event model system 101 as disclosed herein. For example, as described in detail below, state and event model system 101 can facilitate (e.g., via processor 103): learning mutual dependencies jointly over event occurrence data and transition data, wherein the transition data comprises variable transitions observed over a multivariate state variable set.

Machine learning component 104 can learn mutual dependencies jointly over event occurrence data and transition data, wherein the transition data comprises state variable transitions observed over a multivariate state variable set. For example, machine learning component 104 can receive data comprising two variable types: state variables and event labels. Event labels can be denoted as $$\mathcal{E} = \{E_i\}_{j=1}^J.$$

Data about events occurring over time can be defined as $$\mathcal{D}_{\mathcal{E}} = \{(t_k, e_k)\}_{k=1}^{N_E},$$

where $t_k$ are ordered time stamps between initial time $t_0=0$ to end time T, and $e_k$ belong to the event label set $\mathcal{E}$. State variables can be denoted as $$\mathcal{X} = \{X_i\}_{i=1}^I.$$

Val ($X_i$) can be the domain of the variable $X_i$, and Val(X) the domain of the set of state variables X. Data about each variable is of the form of state transitions, $$\mathcal{D}_{X_i} = \{(t_k, x_k)\}_{k=0}^{N_i}$$

up to end time T, where $t_0$ is the initial state and $x_{k+1} \neq x_k$, $x_k \in$ Val($X_i$). Data for all state variables taken together is denoted $\mathcal{D}_{\mathcal{X}} = \cup \mathcal{D}_{X_i}$. As defined herein, an occurrence can refer to either an event label arrival or a state variable transition, e.g., an occurrence is of the form ($t_k$, $z_k$) where $z_k$ is either an event label, $e_k \in \mathcal{E}$, or a state of a state variable $x_k \in$ Val($X_i$), $X \in \mathcal{X}$. As such, $z_k$ is the occurrence label. $\mathcal{D}_z$ can denote data of all occurrences pertaining to both kinds of variables in Z, and $\mathcal{D} = \mathcal{D}_{\mathcal{X}} \cup \mathcal{D}_{\mathcal{E}}$ can denote data for all occurrences of all model variables. In an embodiment, machine learning component 104 can receive event occurrence data comprising time-stamped, asynchronous, irregularly spaced event data regarding multiple event types. For example, the event data may be irregularly space and does not contain measurements of events at regularly space time intervals. Additionally, the event data may be asynchronous with data regarding different event types being measured at different point and/or at different time spans.

In an embodiment, the dynamics of event label arrivals and state variable transitions are driven by historical dependencies. As such, h(·) can denote historical occurrences of either type of variable, e.g., event arrivals or state variable transitions. For example, given variables Z={$Z^\varepsilon$, $Z^x$}, $Z^\varepsilon$ and $Z^x$ are sets of event labels and state labels respectively. Then $h_Z E(t)=\{(t_k, e_k) \in D_Z E:t_k < t\}$ represents the history of event arrivals in the set $Z^\varepsilon \subset \varepsilon$ until time t, and $h_Z X(t)=\{(t_k, x_k) \in D_Z X:t_k < t\}$ represents the history of state variable transitions associated with the set $Z^x \subset \mathcal{X}$ until time t. The combined history is $h_Z(t)=h_{Z^\varepsilon}(t) \cup h_{Z^x}(t)$, wherein $$h_z^*(t)$$

refers to the most recent occurrence label in the history $h_z(t)$.

In an embodiment, machine learning component 104 can use a proximal graphical event model. For example, machine learning component 104 can utilize a state variable graphical event model (SVGEM). The SVGEM can comprise a directed graph $\mathcal{G}$ where every event label $E \in \varepsilon$ has parents $$U_E = \{U_E^{\mathcal{E}}, U_E^X\} \text{ where } U_E^{\mathcal{E}} \text{ and } U_E^X$$

are event label and state variable parents respectively and every state variable $X \in \chi$ has parents $$U_X = \{U_X^{\mathcal{E}}, U_X^X\} \text{ where } U_X^{\mathcal{E}} \text{ and } U_X^X$$

are event label and state variable parents respectively. In an embodiment, graph $\mathcal{G}$ can be a directed acyclic graph. The SVGEM can additionally comprise an initial distribution $$P_\chi^0$$

over state variables and conditional intensity rate parameters $\Lambda$ (for both types of variables) as a function of historical occurrences of parents. For example, every event label $E \in \varepsilon$ occurs with rate $$\lambda_{E|h_{U_E}(t)}$$

at time t, where $h_{U_E}(t)$ denotes the history of all occurrences in parent set $U_E$; each set is denoted $\Lambda_E$. Additionally, every transition s, s' for every state variable $X \in \chi$, s, s' $\in$ Val(X); s≠s', occurs with rate $$\lambda_{E|h_{U_X}(t)}^{s,s'}$$

at time t when $$h_X^*(t) = s,$$

and 0 otherwise, where $h_{U_X}(t)$ denotes the history of all occurrences in parent set $U_X$; each set is denoted $\Lambda_X$.

The SVGEM can capture joint dynamics of all occurrences based on an underlying graph that specifies the causal factors influencing each variable. A more in-depth description of the graph is detailed below in reference to FIGS. 3 and 4. It should be appreciated that an SVGEM is a framework or family of models similar to a graphical event model (GEM). For a fully specified generative model, more details about the general historical dependence (denoted by $\Lambda_E$ and $\Lambda_X$) can be provided.

In an embodiment, either type of variable can be categorized as various types of historical dependence. For example, in an embodiment, a historical dependence is Markov with respect to set Z if the rate at any time depends on only $$h_Z^*(t),$$

e.g., the most recent occurrence label in the history $h_Z(t)$. In another example, the historical dependence is piece-wise constant (PC) with respect to set Z if there is a fully specified mapping from the history $h_Z(t)$ at time t into some discrete state space $\Sigma$. Such a mapping induces the conditional intensity rate for a variable to be piece-wise constant over the timeline for any dataset. In yet another example, the historical dependence is proximal with respect to event label set $Z^\varepsilon$ if the rate at any time t depends only on whether or not each node in $Z^\varepsilon$ has occurred in a preceding time window before t. Proximity with regard to state variables $Z^\chi$ is described in greater detail later in this specification. In an additional example, the historical dependence is restricted by a subset W of set Z if the rate at any time t is 0 when the most recent occurrence label $$h_Z^*(t)$$

belongs to W. Thus, if the most recent occurrence is from W, the occurrence under consideration is impossible.

In an embodiment, an expanded GEM can be defined where state variable transitions can be treated as events that can represent the dynamic process for an underlying SVGEM. Recall that nodes $E \in \varepsilon$ and $X \in \chi$ have parents $$U_E = \{U_E^{\mathcal{E}}, U_E^X\} \text{ and } U_X = \{U_X^{\mathcal{E}}, U_X^X\}$$

respectively. The expanded GEM can be constructed that includes event labels, and the parents for a node E in the expanded GEM are denoted $U_E{}'$. This expanded GEM equivalent for an SVGEM can comprise a directed graph. The directed graph can comprise a node $E_i$ for every event label $E_i \in \varepsilon$ and a node $$E_j^{s,s'}$$

for every possible state transition s, s' of every state variable $X_j \in \chi$ in the SVGEM. The directed graph and additionally comprise directed arcs as follows: (i) for all $E_i$, retain arcs in $$U_E^\varepsilon,$$

and add arcs emanating from all $$E_j^{s,s'}$$

corresponding to $$X_j \in U_{E_i}^X;$$

(ii) for all $$E_j^{s,s'}$$

corresponding to $X_j$, add arcs from all $$U_{X_j}^{\mathcal{E}},$$

all $$E_k^{s,s'}$$

corresponding to $$X_k \in U_X^X,$$

and all $$E_j^{s,s'}$$

corresponding to $X_j$. Furthermore, expanded GEM can comprise conditional intensity parameters as follows: for all $E_i$, the intensity rate remains the same and is determined by historical arrivals of all parent event labels in the GEM $$\lambda_{E_j^{s,s'} | h_{U'_{E_j^{s,s'}}}}(t) = \lambda^{s,s'}_{X_j, | h_{U_{X_j}}}(t).$$

for all $$E_j^{s,s'}$$

corresponding to $X_j$, historical dependence is restricted by the set of nodes $$\left\{ E_j^{s^0,s''} \right\}$$

where s"≠s, otherwise it is equal to the corresponding rate in the SVGEM, $$\lambda_{E_i, | h_{U_{E_i}}}(t) = \lambda_{E_i, | h_{U'_{E_i}}}(t),$$

It should be appreciated that SVGEM makes the difference between event variables and state variable transitions self-evident in comparison to an equivalent GEM. Additionally, an SVGEM can be a more compact model when compared to a GEM, particularly if there are several possible state variable transitions. This reduction can be from $\Sigma_i$ ($|\mathrm{Val}(X_i)|*|\mathrm{Val}(X_i)|-1|$ to $|\chi|$ additional nodes in the graph, therefore making the graph easier to interpret.

As described above, various kinds of historical dependencies can apply for either type of variable. As such, machine learning component 104 can employ various specific types of SVGEMs within the SVGEM framework. For example, a specific type of SVGEM is an SVGEM_MP_MP wherein the first MP signifies that the state variable nodes are Markov with respect to their state variable parents and proximal with respect to their event label parents, and the second MP signifies the same. In this SVGEM type, a node is always Markov with respect to its state variable parents and proximal with regard to its event label parents. As such, an event's arrival rate depends on the current state of its state variable parents. As another example, a specific type of SVGEM is an SVGEM_MP_PP where the state variable dynamics stay the same, but an event label is proximal (as opposed to Markov) with respect to its state variable parents. This is a unique view of dependence on state variables, where the historical occurrence time of a parent state variable transition within a recent window, as well as the nature of the transition, determine an event's arrival rate. In this fashion, historic state transitions are effectively treated as event labels, like in an equivalent GEM of an SVGEM. As such, transitions can be categorized into what are effectively four new label types, all (all transitions are considered equivalent), each (each type of transition is a unique label), in (transitions going into a state are equivalent), and out (transitions going out of a state are equivalent).

In an embodiment, machine learning component 104 can learn $\mathcal{G}$, $$P_X^0,$$

and $\Lambda$ for an SVGEM from data. For example, similar to a GEM model, the parents for every node in an SVGEM can be learned separately and then combined to form the overall graph $\mathcal{G}$. In an embodiment, machine learning component 104 can learn through the use of a hill climbing-score based approach using a Bayesian information criterion (BIC) score, which is used to measure model fit performance in terms of the log likelihood of the model on a given dataset as well as the model complexity. For example, A can be learned for a given graph through the following procedure. If the parents of each node are known, then machine learning component 104 can use the equivalent GEM notion of an SVGEM and ascertain that the log likelihood of a model with parameters $\Lambda=\{\Lambda_X\}, \{\Lambda_E\}$ on an event dataset can be factorized as follows:

$$L(D | \Lambda_X, \Lambda_E) = \left[ \prod_{X \in \mathcal{X}} L\left(D_X | A_X, D_{U_X}\right) \right] \left[ \prod_{E \in \mathcal{E}} L\left(D_E | \Lambda_E, D_{U_E}\right) \right]$$

The computation of individual node log likelihoods is determined by the model parameterization, which depends on the assumptions about historical dependence. As such, the training process can differ slightly based on the specific type of SVGEM used by machine learning component 104.

For example, in an SVGEM_MP_MP, the parameters are $\Lambda = \{\lambda_{E|u_E}, Q_{X|u_X}\} \forall E$, X, which includes intensity rates for event labels E for each parent instantiation $u_X$. This parameterization results in piece-wise constant historical dependence. Machine learning component 104 can therefore learn estimates for intensity rates through summary statistics on an event dataset.

In another example, in an SVGEM_MP_PP, there is an effective expanded label set $\varepsilon \subset \varepsilon'$, some of which are parents for event labels. Since even labels are proximal with regard to parent state variable transitions, which are treated as events in various ways (all/in/out/each), they have a new effective event label parent set $$U_E^*.$$

Not that the parent set for E in the 'each' variation is identical to that in the equivalent GEM for an SVGEM, where each transition is a separate event label. For example, suppose $$u_E^*$$

is a binary vector of indicators specifying which event label parents have occurred in some recent window of time. The parameters in this model are $\Lambda = \{\lambda_{E|u_E}, Q_{X|u_X}\} \forall E, X$. As such, the historical dependence in this model is piecewise-constant and machine learning component 104 can use summary statistics to obtain maximum likelihood estimates of the parameters from an event dataset.

Prediction component 205 can generate predictive alerts, wherein the predictive alerts comprise an expected event type and an expected state transition. In an embodiment, prediction component 205 can receive an SVGEM model learned by machine learning component 104 and current event occurrence data. As the SVGEM illustrates mutual dependencies jointly over occurrence data, prediction component can use the SVGEM to make future predictions. For example, the SVGEM may show that event 2 is likely to occur after event 1, and that event 2 has an impact on a state transition of state variable x from state low to high. Therefore, if the current event occurrence data shows event 1 as occurring, prediction component 205 can issue a predictive alert that event 2 is expected to occur and that it is expected that state variable x will transition from state low to high. In an embodiment, these predictive alerts can be generated in real time. For example, prediction component 205 can receive the current event occurrence data in real time as the event occurrences happen. As an example, the SVGEM can relate to the glucose levels of a patient. Prediction component 205 can receive current occurrence data about the patients meal history and glucose levels. As such, when the patient eats a meal, prediction component 205 can receive data on the meal as an event and generate a predictive alert about an expected event, such as the patient taking insulin and an expected transition, such as a transition in the patients glucose levels from low to high.

Intervention component 206 can compute control actions by tracking the history of event occurrence data and the transition data. As defined herein, a control action is an action a user can take to induce an event to occur or a state transition to occur. In an embodiment, intervention component 206 can receive an SVGEM model learned by machine learning component 104, current event occurrence data, and an intended occurrence. As defined herein, an intended occurrence is an event and/or state variable transition that a user wants to occur or that a user wants to prevent occurring. For example, an intended occurrence could be a transition of glucose levels from low to high. Given that the intended occurrence is a certain state variable transition, and an SVGEM showing that the certain state variable transition depends on event 1 occurring, and event 1 depends on event 2 occurring, intervention component 206 can determine that a control action comprising event 2 is likely to induce the certain state variable transition. In another embodiment, intervention component 206 can compute control actions based on predictive alerts generated by prediction component 205. For example, intervention component 206 can use predictive alerts as part of the occurrence data used to computer control actions. In an example, intervention component 206 can receive an intended occurrence as a state variable transition to avoid, and an SVGEM that shows that the state variable transition depends on a second state variable transition, wherein the second state variable transition can be prevented by the occurrence of event 1. If intervention component 206 receives a predictive alert that the second state variable transition is likely to occur, then intervention component 206 can compute that a control action comprising event 1 is likely to prevent the state variable transition from occurring. In an embodiment, intervention component 206 can receive current event occurrence data and/or predictive alerts in real-time, enabling intervention component 206 to compute control actions in real time. It should be appreciated that by computing control actions, intervention component 206 enables a user to better control future events and state transitions by notifying the user of a control action that is likely to induce or prevent a given occurrence from happening.

Figure 3:
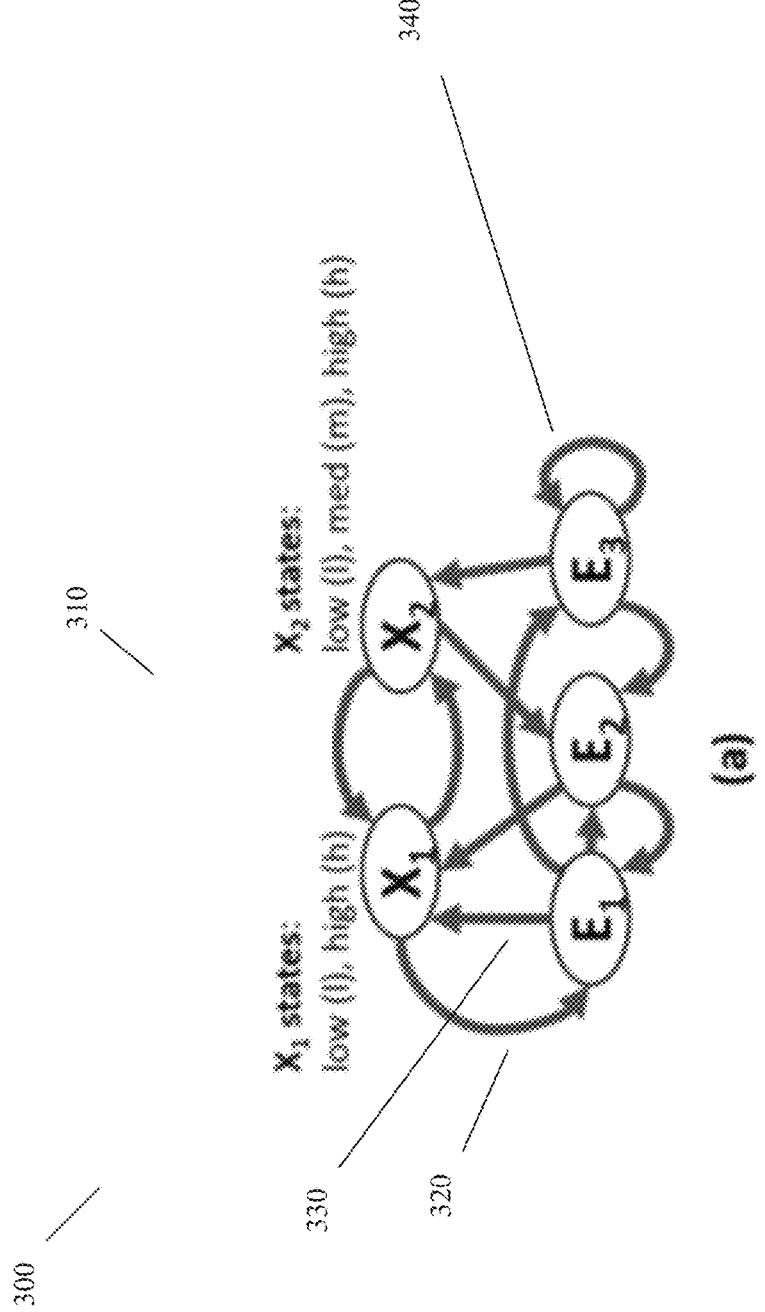
FIG. 3 illustrates a diagram representation of state variable effects in graphical event models in accordance with one or more embodiments described herein.

FIG. 3 illustrates a diagram representation 300 of state variable effects in graphical event models in accordance with one or more embodiments described herein.

Diagram 300 comprises SVGEM 310. SVGEM 310 comprises state transition variable $X_1$ and $X_2$, as well as event variables $E_1$, $E_2$, and $E_3$. Additionally, $X_1$ has the state low and high, while $X_2$ has the states low, medium, and high. SVGEM 310 further comprises a series of directed edges which denote dependencies between variables $X_1$, $X_2$, $E_1$, $E_2$, and $E_3$. For example, directed edge 320 leads from $X_1$ to $E_2$, indicating that the state of $X_1$ and/or the transition between state low and high of $X_1$ has an effect on the occurrence of $E_1$. It is important to note that SVGEM 310 contains mutual dependencies. For example, as described above directed edge 320 indicates that $X_1$ has an impact on $E_1$ but directed edge 330 also indicates that $E_1$ has an impact on $X_1$. Furthermore, it should be appreciated that variable can have an impact on their own future occurrence. For example, directed edge 340 indicates that $E_3$ has an impact on future occurrence of $E_3$.

Figure 4:
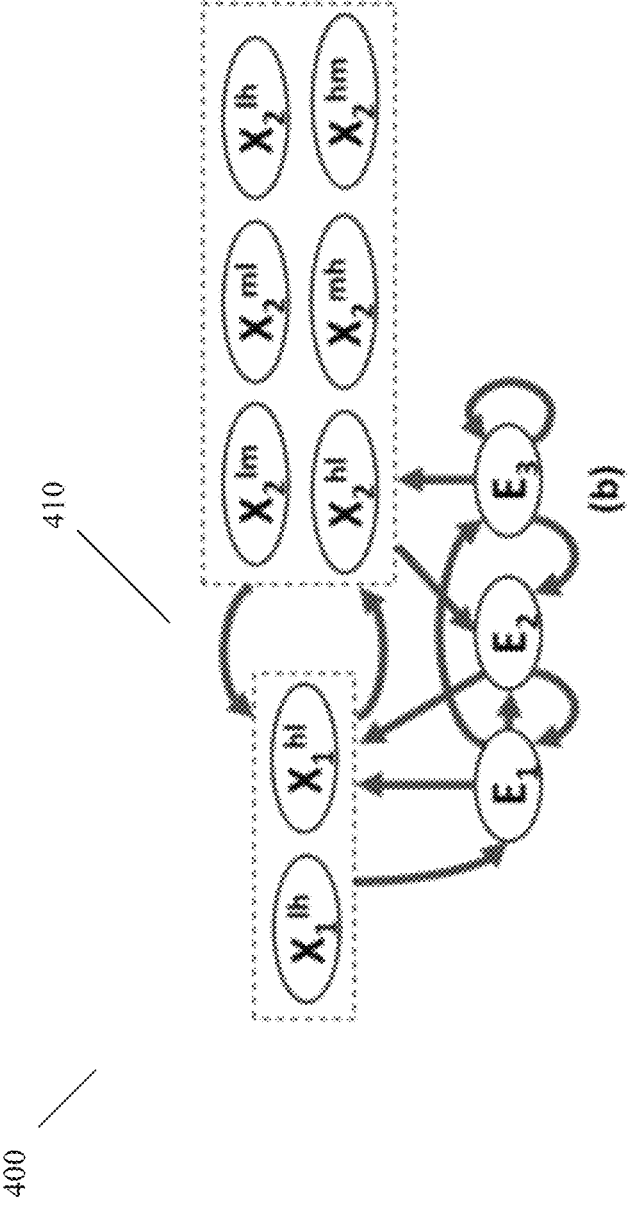
FIG. 4 illustrates a diagram representation of a graphical event model equivalent of a state variable effects in graphical event model in accordance with one or more embodiments described herein.

FIG. 4 illustrates a diagram representation 400 of a graphical event model equivalent of a state variable effects in graphical event model. Diagram 400 comprises GEM 410, which is a GEM equivalent of SVGEM 310. As such GEM 410 comprises event variables $E_1$, $E_2$, and $E_3$. However rather than including state transition variables $X_1$ and $X_2$, GEM 410 includes event variables for each state change of $X_1$ and $X_2$ of SVGEM 310. As such, GEM 410 comprises $X_1$ lh which represents $X_1$ transitioning from state low to high, $X_1$ hl which represents $X_1$ transitioning from state high to low, $X_2$ lm which represents $X_2$ transitioning from state low to medium, $X_2$ ml which represents $X_2$ transitioning from state medium to low, $X_2$ lh which represents $X_2$ transitioning from state low to high, $X_2$ hl which represents $X_2$ transitioning from state high to low, $X_2$ mh which represents $X_2$ transitioning from state medium to high, and $X_2$ hm which represents $X_2$ transitioning from state high to medium. It should be appreciated that when SVGEM 310 is compared to GEM 410, SVGEM 310 offers a more compact and less cluttered model due to the use of state transition variables as opposed to representing each state transition as an event variable. Additionally, SVGEM makes the semantic difference between an event variable and a state transition variable self-evident through the use of two different variable types. Furthermore, incorporating constraints regarding state transitions variables is easier in SVGEM 310 due to the reduced overall number of variables and directed edges.

Figure 5:
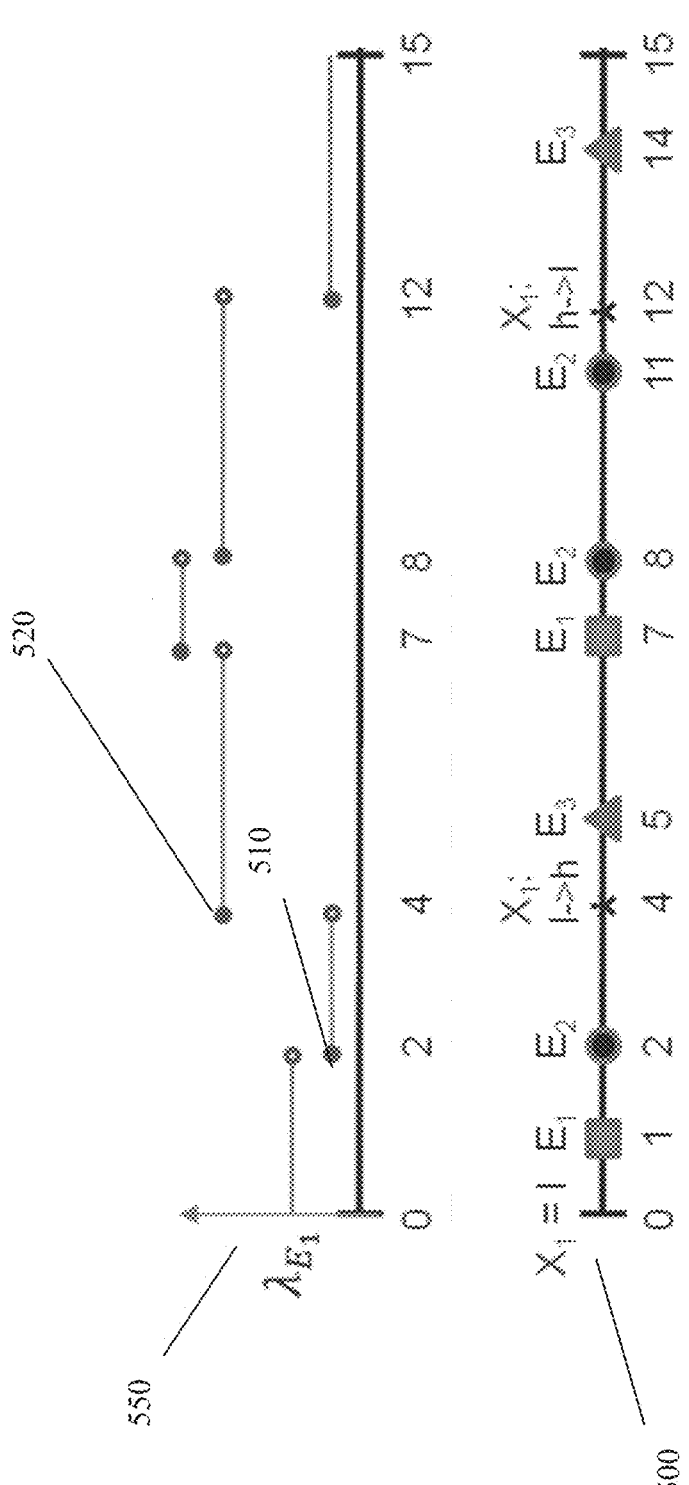
FIG. 5 illustrates a diagram representation of streams of events and state transitions in accordance with one or more embodiments described herein.

FIG. 5 illustrates a diagram representation 500 of event occurrence and state transition data and a graphical representation 550 of the conditional intensity rate for an event variable over time.

Diagram 500 comprises a stream of event occurrence data over a period of time. For example, diagram 500 illustrates occurrences of $E_1$, shown as squares, $E_2$, shown as circles, and $E_3$, shown as triangles. Additionally, diagram 500 illustrates transitions for state variable $X_1$, shown as asterisks. In an embodiment, machine learning component 104 can receive diagram 500 as event occurrence and state transition data and learn mutual dependencies from it. For example, as shown in diagram 500 $E_1$ tends to precede $E_2$, indicating that $E_2$ may depend on $E_1$. Furthermore, diagram 500 shows that transitions of state variable $X_1$ tend to proceed occurrences of $E_3$, indicating that occurrence of $E_3$ may depend on transitions of $X_1$.

Graph 550 illustrates the conditional intensity rate (likelihood of occurring) of $E_1$ over time. In graph 550 it is assumed that $E_1$ is Markov with respect to $X_1$ and proximal with respect to $E_2$. The y-axis of graph 550 shows the likelihood of $E_1$ occurring and the x-axis shows the time window. As shown at time 2, marked as point 510, the likelihood of $E_1$ occurring drops in response to the occurrence of $E_2$ at time 2 shown in diagram 500. Additionally, as shown at time 4, marked as point 520, the likelihood of $E_1$ occurring increases due to a state transition of $X_1$.

FIG. 6 illustrates a diagram 600 of datasets used in testing of SVGEMs. Diagram 600 comprises four datasets Synthetic 610, Eastman 620, Diabetes 630, and Crypto 640. Diagram 600 also shows the number of state variables $|(\chi)|$, the number of event labels $|(\varepsilon)|$, the number of state transitions $\Sigma_i N_i$, and the number of events $N_E$ for each dataset. Synthetic 610 is a synthetic joint temporal data set which accounts for the current states of parent state variables and the current conditions of parent event labels at any time and comprises 3 data sets with 5 state variables and 5 event labels.

Eastman 620 comprises two data sets that are produced by a simulation of a process involving chemical reactions that produce two liquid products from four gaseous reactants leading to a data set with 16 state variables with 3 states and 18 event labels.

Diabetes 630 is a data set with information pertaining to diabetic patients, wherein events include insulin dosage, eating and exercise related activities. The blood glucose level is modeled as a state variable, and data for the state variable is formed from discretization of raw measurements into 3 states.

Crypto 640 is data involving ratings between users on a cryptocurrency exchange. The data is processed from the perspective of each user, associating the user with 6 event labels depending on whether the user sent a rating, and whether the rating was positive, neutral or negative. Note that the state variables do not transition in this set.

FIG. 7 illustrates a diagram 700 of the performance of SVGEM models using test data sets. Diagram 700 shows loglikelihood performance results for two SVGEMs, SVGEM_MP_MP and SVGEM_MP_PP and performance results for three baseline models CTBN+PGEM, CTBN+PCIM, and PGEM-each. In the CTBN+PGEM state variables and event labels are modeled independently, specifically, state variable transitions are learned using a CTBN and event label arrivals are learned using a PGEM. In the CTBN+PCIM, state variable transitions are learned using a CTBN and event label arrivals are modeled using a piecewise constant intensity model learner. In the PGEM-each, every state transition in the dataset is modeled as separate types of events, and then the PGEM learner is run to fit the new dataset. Note that this is different from an equivalent GEM since there is no explicit accounting for any constraints between events. As shown, the lower the value, the lower loglikelihood and thus the better performance of the model. As illustrated in diagram 700, the SVGEM_MP_MP model had the best performance of all models in the tests of the 3 synthetic datasets within Synthetic 610. Additionally, SVGEM_MP_PP shows the best performance in the two data sets within Eastman 620. Furthermore, the SVGEM_MP_PP model shows the best performance in regard to the dataset Diabetes 630.

Figure 8:
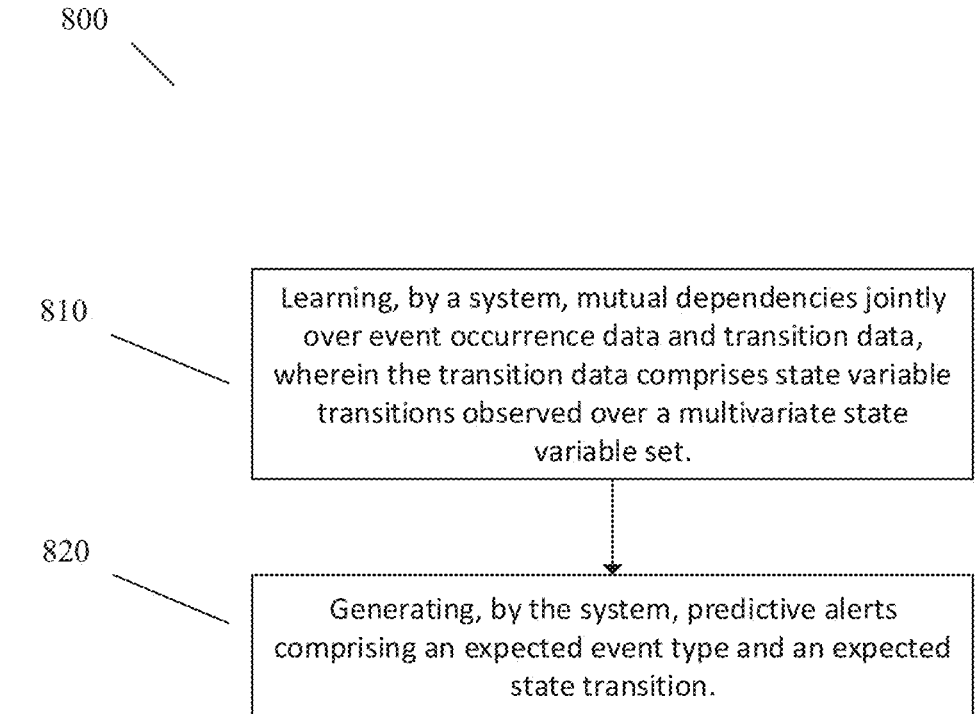
FIG. 8 illustrates a flow diagram of an example, non-limiting computer-implemented method that can facilitate modeling bi-directional effects between events and system variables in accordance with one or more embodiments described herein.

FIG. 8 illustrates a flow diagram of an example, non-limiting computer-implemented method 800 that can facilitate modeling bi-directional effects between events in accordance with one or more embodiments described herein. Repetitive description of like elements and/or processes employed in respective embodiments is omitted for sake of brevity.

At 810, computer-implemented method 800 can comprise learning, by a system (e.g., state and event model system 101 and/or machine learning component 104) operatively coupled to a processor (e.g., processor 106), mutual dependencies jointly over event occurrence data and transition data, wherein the transition data comprises state variable transitions observed over a multivariate state variable set. For example, as described in detail in reference to FIGS. 1 and 2, machine learning component 104 can receive time stream data comprising event occurrences and state transitions. Machine learning component can then learn the mutual dependencies between event occurrences and state transitions using, for example, a Bayesian network, such as a continuous time Bayesian network. Machine learning component 104 can then create an SVGEM graph wherein nodes include event variables and state transition variables, and directed edges which denoted intervariable dependencies.

At 820, computer-implemented method 800 can comprise generating, by the system (e.g., state and event model system 101 and/or prediction component 205), predictive alerts comprising an expected event type and an expected state transition. For example, as described in detail in reference to FIGS. 1 and 2, prediction component 205 can received the learned SVGEM model from machine learning component 104. Prediction component 205 can then receive a current times series comprising event occurrence data and/or state transition data. Based on the history of events in the current time series, prediction component 205 can use the mutual dependencies shown in the SVGEM in order to generate a predictive alert comprising an expected event type or expected state transition that is likely to occur based on the history of events in the recent time series and the mutual dependencies modeled in the SVGEM.

FIG. 9 illustrates a flow diagram of an example, non-limiting computer-implemented method 900 that can facilitate modeling bi-directional effects between events in accordance with one or more embodiments described herein. Repetitive description of like elements and/or processes employed in respective embodiments is omitted for sake of brevity.

At 910, computer-implemented method 900 can comprise learning, by a system (e.g., state and event model system 101 and/or machine learning component 104) operatively coupled to a processor (e.g., processor 106), mutual dependencies jointly over event occurrence data and transition data, wherein the transition data comprises state variable transitions observed over a multivariate state variable set. For example, as described in detail in reference to FIGS. 1 and 2, machine learning component 104 can receive time stream data comprising event occurrences and state transitions. Machine learning component can then learn the mutual dependencies between event occurrences and state transitions using, for example, a Bayesian network. Machine learning component 104 can then create an SVGEM graph wherein nodes include event variables and state transition variables, and directed edges which denoted intervariable dependencies.

At 920, computer-implemented method 900 can comprise generating, by the system (e.g., state and event model system 101 and/or prediction component 205), predictive alerts comprising an expected event type and an expected state transition. For example, as described in detail in reference to FIGS. 1 and 2, prediction component 205 can receive the learned SVGEM model from machine learning component 104. Prediction component 205 can then receive a current times series comprising event occurrence data and/or state transition data. Based on the history of events in the current time series, prediction component 205 can use the mutual dependencies shown in the SVGEM in order to generate a predictive alert comprising an expected event type or expected state transition that is likely to occur based on the history of events in the recent time series and the mutual dependencies modeled in the SVGEM.

At 930, computer-implemented method 900 can comprise computing, by the system (e.g., state and event model system 101 and/or intervention component 206), control actions by tracking the history of event occurrence data and the transition data in real-time. For example, as described in detail in reference to FIGS. 1 and 2, intervention component 206 can receive current time series data, the learned SVGEM model from machine learning component 104, an intended event or state transition, and/or a predictive alert generated by prediction component 205. Based on these inputs, intervention component 206 can then compute a control action in order to either increase or decrease the likelihood of the intended event or state transition occurring.

State and event model system 101 can provide technical improvements to a memory unit associated with state and event model system 101. For example, by representing transitions as state transition variables as opposed to event variables, state and event model system 101 can decrease the overall number of nodes and/or directed edges within a graphical model, thereby decreasing the storage size and the number of memory operations performed, thereby reducing the workload of a memory unit (e.g., memory 102) that is employed to execute the memory operations. In this example, by reducing the workload of such a memory unit (e.g., memory unit 102), state and event model system 101 can thereby facilitate improved performance, improved efficiency, and/or reduced computational cost associated with such a memory unit.

State and event model system 101 can employ hardware or software to solve problems that are highly technical in nature, that are not abstract and that cannot be performed as a set of mental acts by humans. In some embodiments, one or more of the processes described herein can be performed by one or more specialized computers (e.g., a specialized processing unit, a specialized classical computer, a specialized quantum computer, and/or another type of specialized computer) to execute defined tasks related to the various technologies identified above. State and event model system 101 and/or components thereof, can be employed to solve new problems that arise through advancements machine learning and/or other technologies.

It is to be appreciated that state and event model system 101 can utilize various combinations of electrical components, mechanical components, and circuitry that cannot be replicated in the mind of a human or performed by a human, as the various operations that can be executed by state and event model system 101 and/or components thereof as described herein are operations that are greater than the capability of a human mind. For instance, the amount of data processed, the speed of processing such data, or the types of data processed by state and event model system 101 over a certain period of time can be greater, faster, or different than the amount, speed, or data type that can be processed by a human mind over the same period of time.

According to several embodiments, state and event model system 101 can also be fully operational towards performing one or more functions (e.g., fully powered on, fully executed, and/or another function) while also performing the various operations described herein. It should be appreciated that such simultaneous multi-operational execution is beyond the capability of a human mind. It should also be appreciated that state and event model system 101 can include information that is impossible to obtain manually by an entity, such as a human user. For example, the type, amount, and/or variety of information included in state and event model system 101, machine learning component 104, prediction component 205, and/or intervention component 206 can be more complex than information obtained manually by an entity, such as a human user.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
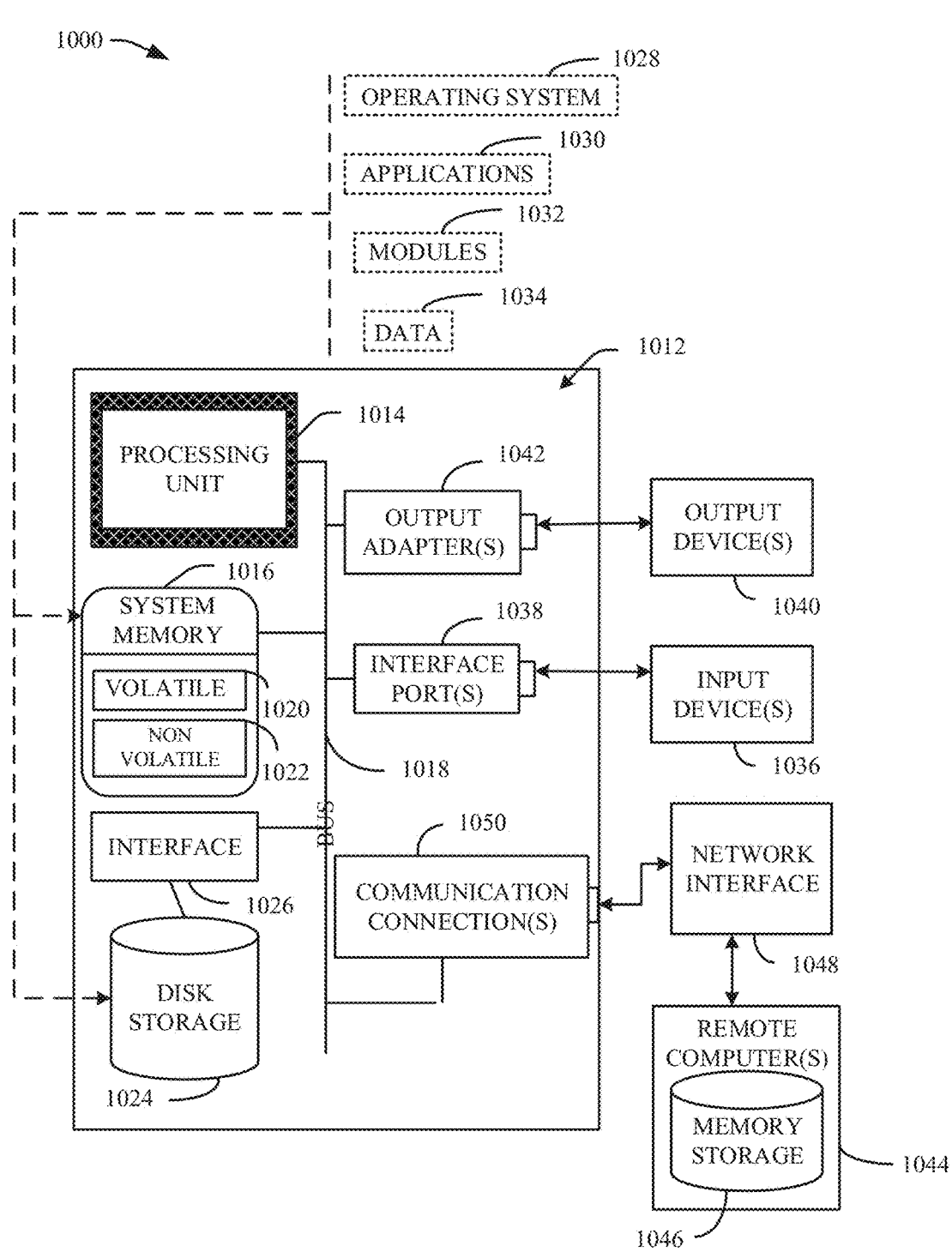
FIG. 10 illustrates a block diagram of example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 824, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, and/or another wire and/or wireless communication network. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, and/or other program modules that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, handheld computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a memory that stores computer executable components; and a processor that executes computer executable components stored in the memory, wherein the computer executable components comprise:

a machine learning component that learns mutual dependencies jointly over event occurrence data and transition data, wherein the transition data comprises state variable transitions observed over a multivariate state variable set, wherein the machine learning component generates a state variable graphical event model that represents the mutual dependencies, the state variable graphical event model being a directed graph comprising:

first nodes representing events, second nodes representing the state variable transitions, the second nodes being represented distinctly from the first nodes, first directed edges running from the first nodes to the second nodes and representing respective dependencies of certain state variable transitions on the events, and at least one second directed edge running from at least one of the second nodes to at least one of the first nodes and representing respective dependencies of the events on the state variable transitions, wherein the event occurrence data comprises time-stamped, asynchronous, irregularly spaced event data regarding multiple event types and the transition data is represented as the state variable transitions as opposed to event variables;

a prediction component that generates predictive alerts based on real-time event occurrence data, real-time transition data, and the state variable graphical event model; and an intervention component that generates a control action recommendation based on at least one of the predictive alerts and the state variable graphical event model.

2. The system of claim 1, wherein the intervention component receives the state variable graphical event model learned by the machine learning component, current event occurrence data and an intended occurrence.

3. The system of claim 1, wherein the machine learning component uses a continuous time Bayesian network.

4. The system of claim 1, wherein the machine learning component learns intervariable dependencies in a form of statistical correlations over event variables and state variables.

5. The system of claim 1, wherein the predictive alerts comprise an expected event type and an expected state transition.

6. The system of claim 5, wherein the predictive alerts are generated by tracking the history of the event occurrence data and the transition data in real-time.

7. The system of claim 1, wherein the computer executable components further comprise:

the intervention component generates control actions by tracking the history of the event occurrence data and the transition data in real-time.

8. A computer-implemented method, comprising:

learning, by a system operatively coupled to a memory and a processor, mutual dependencies jointly over event occurrence data and transition data, wherein the transition data comprises state variable transitions observed over a multivariate state variable set, wherein the learning comprises generating a state variable graphical event model that represents the mutual dependencies, the state variable graphical event model being a directed graph comprising:

first nodes representing events, second nodes representing the state variable transitions, the second nodes being represented distinctly from the first nodes, first directed edges running from the first nodes to the second nodes and representing respective dependencies of certain state variable transitions on the events, and at least one second directed edge running from at least one of the second nodes to at least one of the first nodes and representing respective dependencies of the events on the state variable transitions, wherein the event occurrence data comprises time-stamped, asynchronous, irregularly spaced event data regarding multiple event types and the transition data is represented as the state variable transitions as opposed to event variables;

receiving ongoing event occurrence data and ongoing transition data in real-time;

generating, by the system, at least one of a predictive alert and a control action recommendation based on the received ongoing event occurrence data, the received ongoing transition data, and the state variable graphical event model; and presenting, by the system, the at least one of the predictive alert and the control action recommendation.

9. The computer-implemented method of claim 8, further comprising:

generating, by the system, the predictive alert comprising an expected event type and an expected state transition.

10. The computer-implemented method of claim 9, wherein the predictive alert is generated by tracking the history of the event occurrence data and the transition data in real-time.

11. The computer-implemented method of claim 8, further comprising:

generating, by the system, the control action recommendation by tracking the history of the event occurrence data and the transition data in real-time.

12. The computer-implemented method of claim 8, wherein the state variable graphical event model further comprises a third directed edge running from a first one of the first nodes to the first one of the first nodes and indicating that the first one has an impact on a future occurrence of the first one.

13. A computer program product comprising a computer readable storage medium having program instructions embodied therewith, the program instructions executable by a processor to cause the processor to:

learn mutual dependencies jointly over event occurrence data and transition data, wherein the transition data comprises state variable transitions observed over a multivariate state variable set, wherein the learning comprises generation of a state variable graphical event model that represents the mutual dependencies, the state variable graphical event model being a directed graph comprising:

first nodes representing events, second nodes representing the state variable transitions, the second nodes being represented distinctly from the first nodes, first directed edges running from the first nodes to the second nodes and representing respective dependencies of certain state variable transitions on the events, and at least one second directed edge running from at least one of the second nodes to at least one of the first nodes and representing respective dependencies of the events on the state variable transitions, wherein the event occurrence data comprises time-stamped, asynchronous, irregularly spaced event data regarding multiple event types and the transition data is represented as the state variable transitions as opposed to event variables;

receive ongoing event occurrence data and ongoing transition data in real-time;

generate at least one of a predictive alert and a control action based on the received ongoing event occurrence data, the received ongoing transition data, and the state variable graphical event model; and present the at least one of the predictive alert and the control action.

14. The computer program product of claim 13, wherein predictive alert comprises an expected event type and an expected state transition.

15. The computer program product of claim 14, wherein the predictive alert is generated by tracking the history of the event occurrence data and the transition data in real-time.

16. The computer program product of claim 14, wherein the program instructions are further executable by the processor to cause the processor to:

generate control actions by tracking the history of the event occurrence data and the transition data in real-time.

* * * * *